US005652587A

United States Patent [19]

Liu

[11] Patent Number: 5,652,587

[45] Date of Patent: Jul. 29, 1997

[54] REMOTE CONTROL DEVICE HAVING MEANS THEREIN FOR STORAGE OF A HAND TOOL

[76] Inventor: Chang-Jen Liu, 2819 Comply Rd., Philadelphia, Pa. 19154

[21] Appl. No.: 552,944

[22] Filed: Nov. 3, 1995

Related U.S. Application Data

[63] Continuation-in-part of Ser. No. 377,338, Jan. 24, 1995.

[51] Int. Cl.[6] .................... G05B 19/02

[52] U.S. Cl. .................... 341/176; 362/119

[58] Field of Search .................... 341/176; 362/167, 362/119; 307/64, 65

[56] References Cited

U.S. PATENT DOCUMENTS

| | | | |
|---|---|---|---|
| 5,402,008 | 3/1995 | St. John | 307/64 |
| 5,412,377 | 5/1995 | Evans | 341/176 |
| 5,461,382 | 10/1995 | Deguchi | 341/176 |
| 5,481,251 | 1/1996 | Buts | 341/176 |

*Primary Examiner*—Jeffery Hofsass

*Assistant Examiner*—Albert K. Wong

*Attorney, Agent, or Firm*—Leonard Bloom

[57] ABSTRACT

A remote control which contains small hand tools has dual power supply for supplying electricity to remote control circuit and the lighting system respectively, or in combination. A pin with three terminals is installed to decide manually whether to supply the electricity separately or in combination by simply changing its connecting position. Also the addition of the antenna increases the effective range of communication of the remote control.

2 Claims, 5 Drawing Sheets

REMOTE CONTROL DEVICE HAVING MEANS THEREIN FOR STORAGE OF A HAND TOOL

FIELD OF THE PRESENT INVENTION

This is a continuation-in-part (CIP) of the U.S. patent application Ser. No. 08/377,338 filed Jan. 24,1995. The invention relates generally to a remote control and in particular to a remote control that provides functions other than "control".

BACKGROUND OF THE INVENTION

Nowadays, remote controls have been widely used for convenience of controlling operation of different devices, such as power door lock for automobiles. In general, conventional remote controls provide only the function of actuation/de-actuation or "control" of a device which is equipped with a receiver to receive the electromagnetic signal transmitted from the remote control.

On the other hand, in certain situations, people may need small hand tools, such as screw drivers or pens, but have no such tools at hand. This occurs frequently and always causes inconvenience and trouble, besides, the antenna of most of the remote control is hidden within the housing, which shortens the effective distance.

To solve such an inconvenient problem of looking for handy hand tools, it would be advisable to incorporate hand tools into a remote control or to provide a storage space within the remote control for receiving the hand tools. The combination of hand tools with a remote control allows a user to obtain handy tools when the user carries the remote control.

SUMMARY OF THE INVENTION

It is therefor an object of the present invention to provide a remote control having dual power circuit for applying to the control and lighting system respectively. A switch for switching over the electricity of either the remote control or of the lighting system to the other when either one is down is added within the remote control for expanding and securing the life span of the remote or lighting function.

Another object of the present invention is to provide a remote control with an antenna which can also be functioned as a screw driver.

Still another object of the present invention is to provide a remote control having a cover under the base to provide a space for securely storing tools therein.

The present invention as will be disclosed by the accompanying drawings and description is not to limit the scope or spirit of the invention. They are merely described as preferred embodiments of the present invention.

BRIEF DESCRIPTION OF THE DRAWINGS

Reference is now made to the accompanying drawings, in which it is shown an illustrative embodiment of the present invention from which its novel features and advantages will be apparent, wherein.

DETAILED DESCRIPTION OF THE PREFERRED EMBODIMENT

Figure 1:
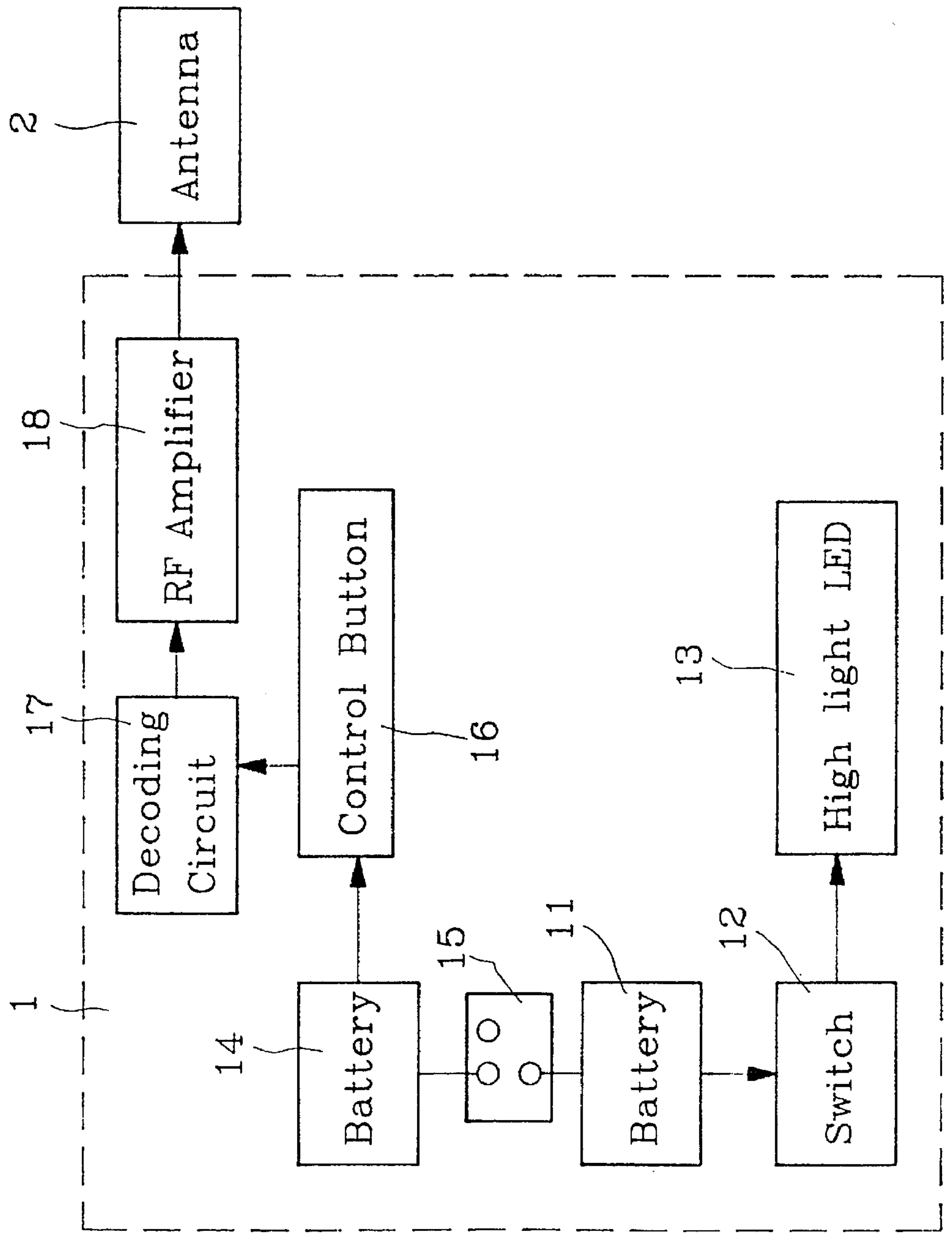
FIG. 1 is a functional block diagram of the present invention.

With reference to the drawings, and in particular to FIG. 1, wherein a functional block diagram of a remote control constructed in accordance with the present invention is shown, a high light LED 13 is disposed within the remote control of the present invention to be powered by a battery set 11 connecting to a switch 12 to form a closed loop for controlling the actuation/de-actuation of the high light LED 13. Battery set 14 is to power the remote control circuit of the remote control whose operation is determined by manually-operable control button 16. The actuation of the control button 16 generates a user control signal which is in turn decoded by a decoding circuit 17 and then amplified by a RF (radio frequency) amplifier 18 and transmitted by an antenna 2. A pin 15 is mounted between the battery sets 11, 14 for linking the two battery sets when required.

Figure 2:
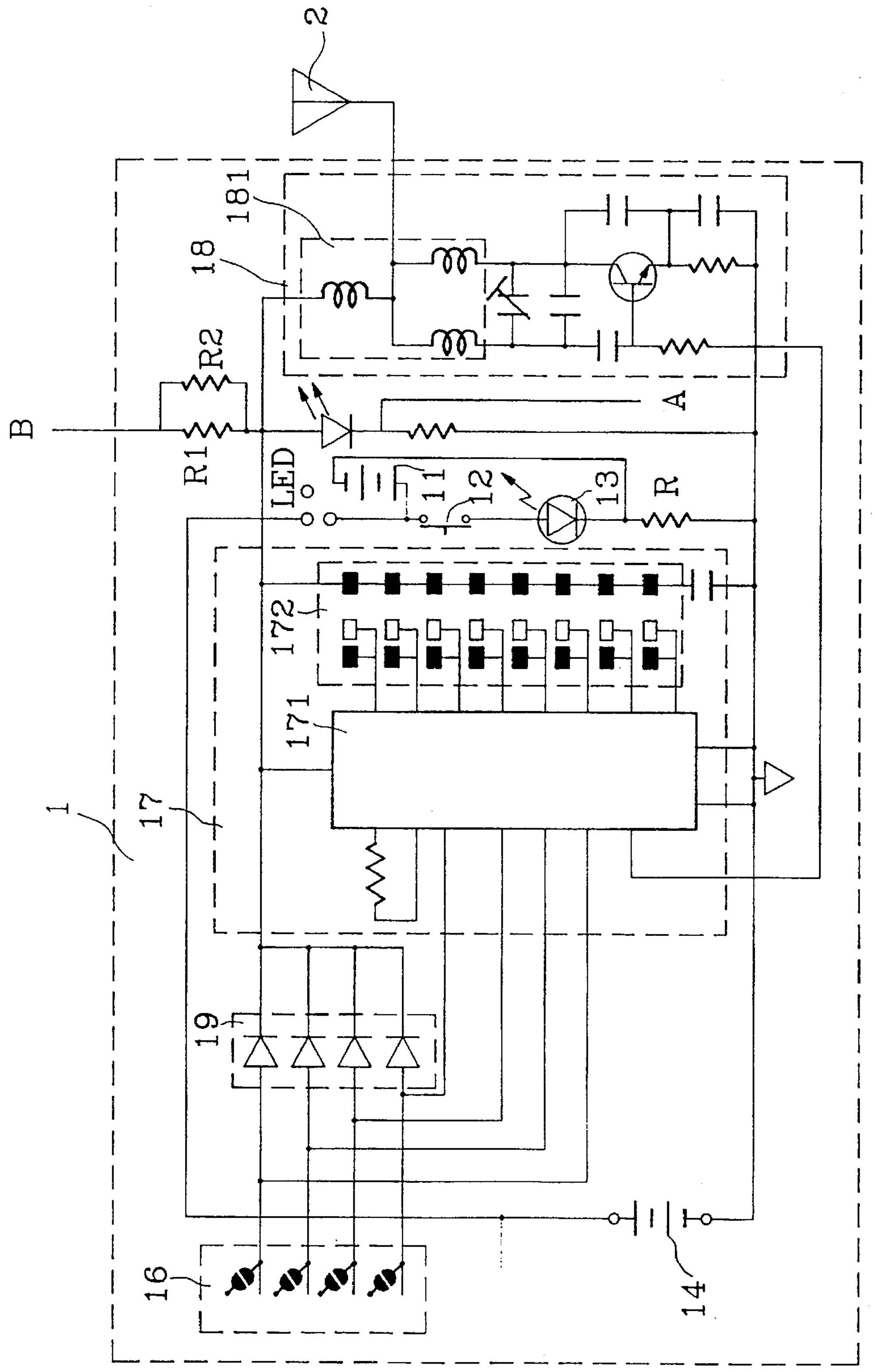
FIG. 2 is a detailed circuit diagram of the remote control of the present invention.
Figure 3:
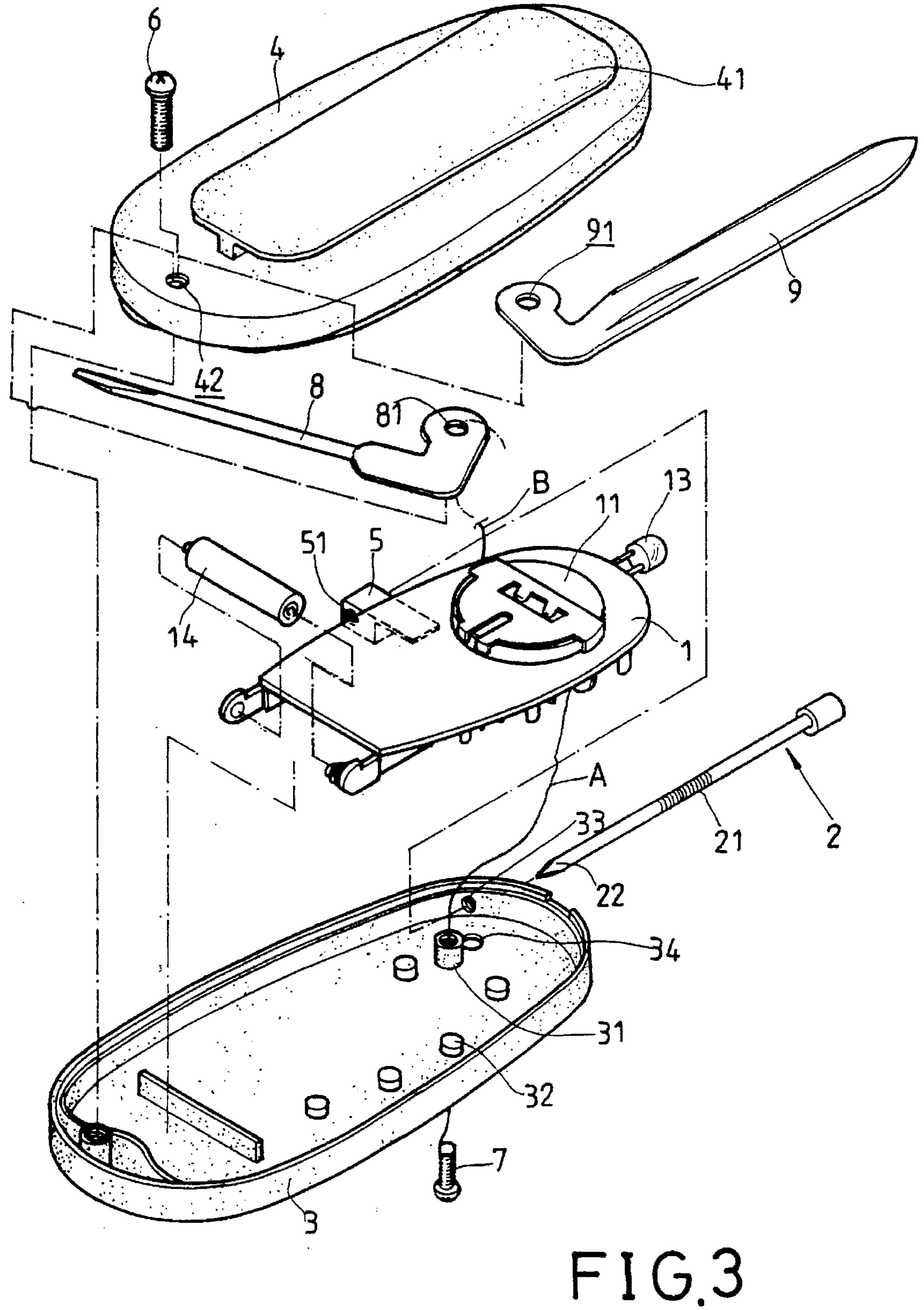
FIG. 3 is an exploded perspective view of the remote control constructed in accordance with the present invention.

Referring now to FIG. 2 which shows a circuit diagram of the remote control of the present invention, the pin 15 has three ends, the first end is connected to the anode of the battery set 14, the second end open and the third end connected to the anode of the battery set 11 and the switch 12. A second end of the switch 12 is connected to the anode of the high light LED 13, and the cathode of the high light LED is connected to the cathode of the battery set 11 to form a closed loop. The battery set 14 is connected to one end of the function-choice control button 16, a second end of the control button 16 being connected to the anode of a diode 19 and the input terminal of the decoder 171 of the decode circuit 17. The cathode of the diode 19 is connected to a common input terminal between the decoder 171 and a diode. The anode of the LED is connected to connector B via a resistor network composed of two resistors R1 and R2 in parallel. The connector B is then connected to a screw driver 8 functioning as an electricity testing probe (as shown in FIG. 3). The cathode of the LED connected with a connector A is connected to a screw 7 (as shown in FIG. 3) to form a closed loop of the testing probe. When the LED is lit, it means that the control button 16 is pressed down, and in the mean time the common input terminal and another terminal will proceed the process of decoding to determine which button has been pressed and what exactly the user wished. An encoder 172 generates a pre-programed coding signal to be mixed with a signal decoded by the decoder 171. After the signal has been decoded, and mixed with the pre-programed coding signal from the encoder 172, it is then output by the encoding circuit 17, amplified by a RF amplifier 18, and transmitted by an antenna 2. The pre-programed coding signal from the encoder 172 prevents interference with other remote control devices.

Because the present invention comprises dual power circuit wherein the battery set 14 supplies power to the remote control and the battery set 11 supplies power to the lighting system. Normally, the pin 15 is connected to the positive terminal (anode) and the open terminal of the battery set 14 so as to define two isolated circuits are thus defined. As for the high light LED 13 consumes greater electricity, a situation of power shortage happens very often. When power-down or power-low happens to the remote control circuit, changing the position of pin 15 to connect to the anode of battery 11 and one terminal of switch 12 will form another closed loop including the remote control circuit 1 and the lighting circuit, which the power of battery set 14 will provide to the lighting circuit to extend its service life.

Figure 4:
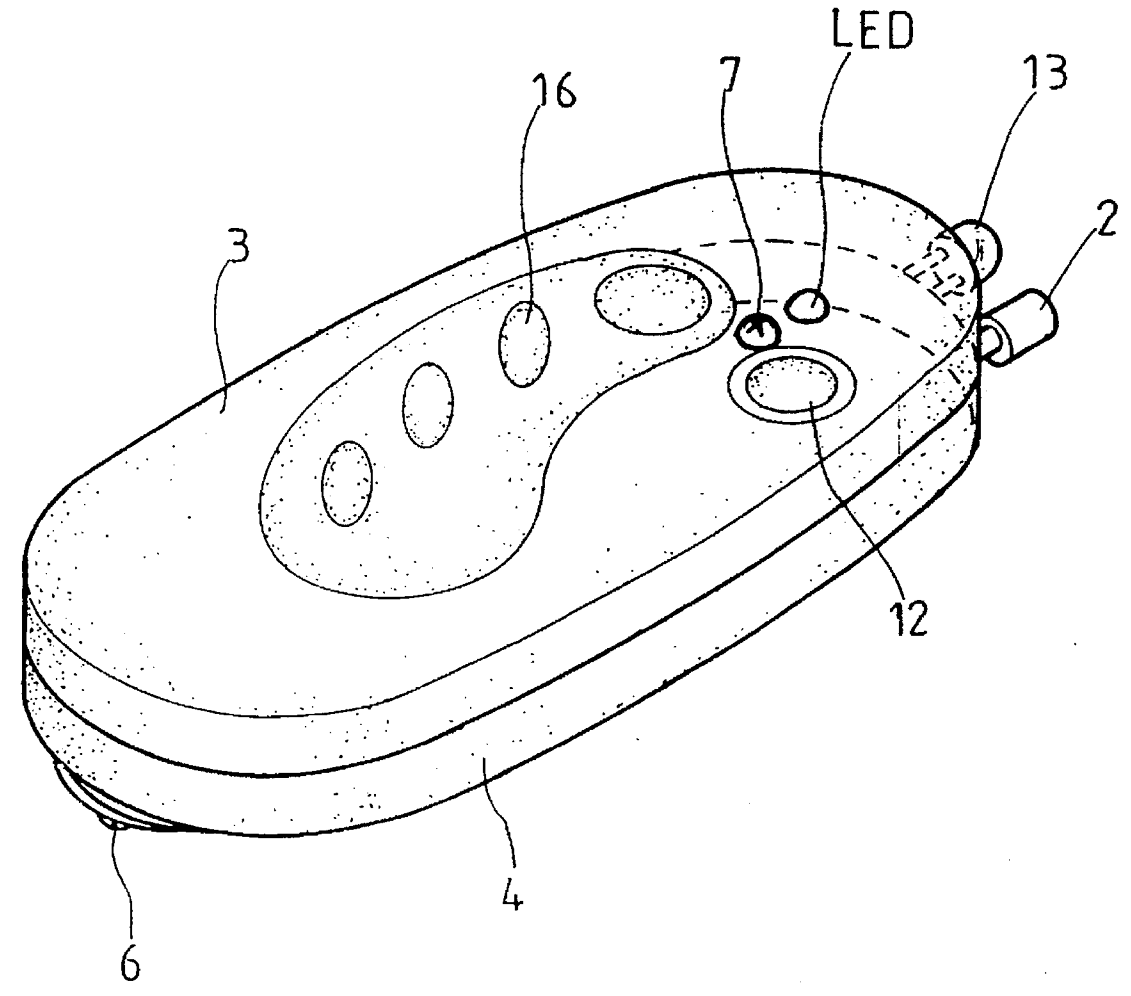
FIG. 4 is a perspective view of the remote control of the present invention.
Figure 5:
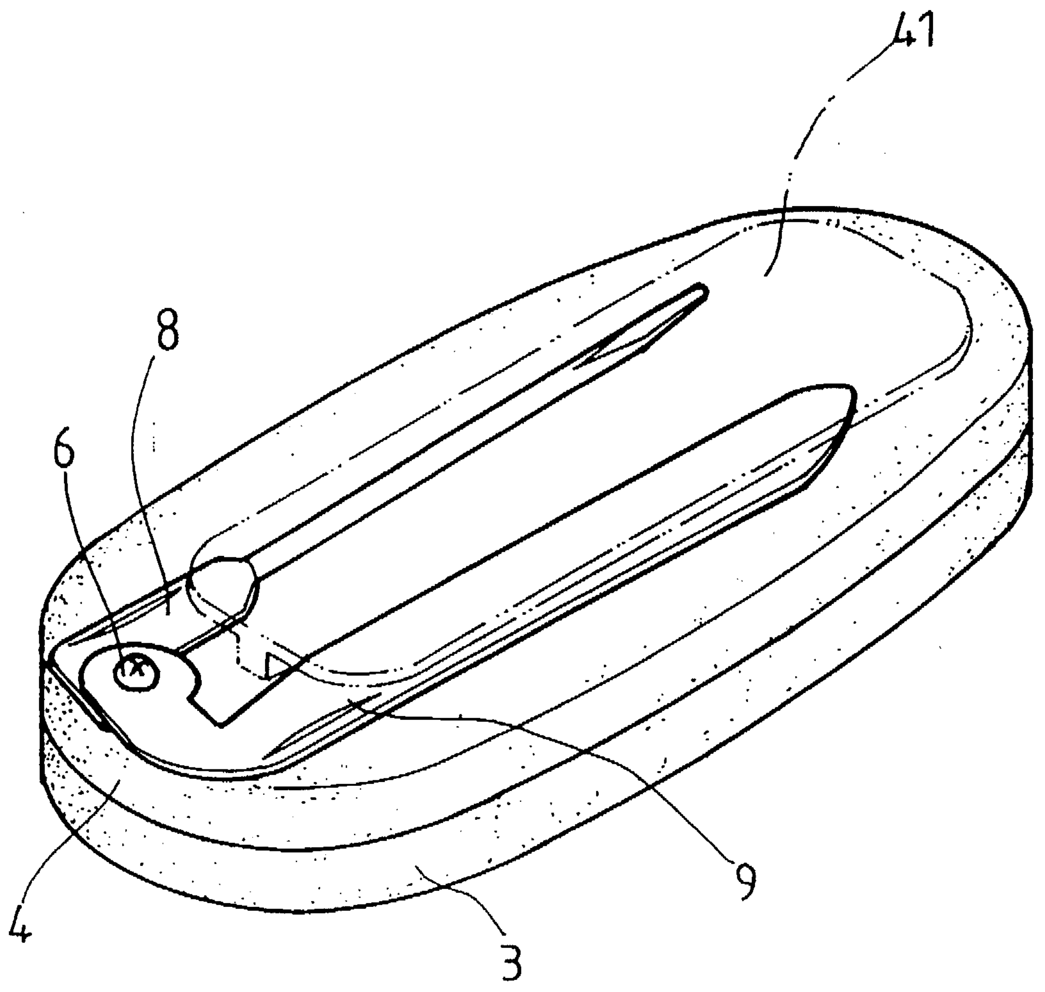
FIG. 5 is a schematic view of the remote control constructed in accordance with the present invention showing tools are stored within the housing of the remote control.

Referring to FIGS. 3 and 4, the remote control constructed in accordance with the present invention consists of first lid 3 and second lid 4. A plurality of projections 32 for receiving control button 16 and switch 12 and one hollow tubular 31 for securing the first and the second lids 3, 4 respectively with screw 7 are formed on the first lid 3. A hole 33 is formed on one side of the first lid 3 for inserting antenna 2 having threads 21 in the center part and flat or cross head at the other end for use as a screw driver 22. A welded metal antenna base 5 on the remote control circuit 1 is designed to have a securing hole 51 corresponding to the hole 33 on the first lid 3, which has threads therein mated with the threads 21 of the antenna 2. Antenna 2 is first inserted into the hole 33 on the first lid 3 and is secured to the securing hole 51 of the antenna base 5, therefore, the control signal can be transmitted via antenna 2. When antenna 2 is disassembled from its securing position, it is used as a screw driver 22.

A hole 34 for receiving therein the LED is provided on the first lid 3 where the recession 35 formed by the corresponding shape of the first lid 3 and the second lid 4 is to secure the high light LED 13. A cover 41 is fixed on the second lid 4. The ends of the knife 9 and the screw driver 8 respectively are formed with a hole 81, 91. When not in use, the knife 9 and the screw driver 8 are screwed safely and conveniently under the cover 41 to the hole 42 of the second lid 4 with screw 6, and to use, just turn the knife 9 or screw driver 8 outward.

The first lid 3 and the second lid 4 are tightly secured by a screw 7 connecting with connector A to the cathode of the LED. When the device of the invention is used as a testing probe, user may first use his/her finger to press the head 71 of the screw 7 and then insert the screw 8 into an electric outlet (with unknown voltage, 110 V or 220 V), in this situation, the screw driver 8, connector B, resistor network R1 and R2, LED, connector A, and the human body constitute a complete closed loop indicating whether the electric outlet is electrically powered by observing the illumination of the LED.

In general, the device of the present invention has several advantages, such as:

1. Small hand tools are stored inside the remote control housing, which increases the convenience and simplicity of the user, especially when the hand tools are urgently required.
2. Installation of the antenna increases the effective range of communication.
3. Dual power circuit respectively powers the remote control and the lighting system, eliminating the disadvantages of single power circuit, and because of the installation of the pin, the electricity from the remote control supports the lighting system when the remote control is down, which expands the life of the device.

Although preferred embodiments have been described to illustrate the present invention, it is apparent that changes and modifications in the specifically described embodiments can be carried out without departing from the scope of the invention which is intended to be limited only by the appended claims.

What I claim is:

1. Remote control device comprising:

a housing accommodating first and second batteries, a remote control circuit powered by the first battery, a lighting system powered by the second battery, and a manually operated means for linking said lighting system to the first battery and said remote control circuit to said second battery, as needed;

wherein the housing further comprises first and second lids having respective apertures and removably secured to each other by means of a first screw protruded through these apertures aligned to each other;

wherein a cover is secured to an outer surface of the first lid;

wherein a screwdriver and a knife are pivotally secured to said first lid, the screwdriver and the knife having respective apertures for said first screw to pass through, and wherein, in a closed position, either one of the screwdriver and the knife, is retained between the outer surface of said first lid and said cover.

2. The remote control circuit of claim 1, further including a light emitting means observed through the second lid, said light emitting means having positive and negative terminals, wherein, a first electrical connector is connected to said positive terminal, and said second electrical connector is connected to said negative terminal, wherein, when said first and second lids are secured to each other by said first screw, the first connector protrudes through said apertures in the lids, the screwdriver and the knife, and thereby is connected to said first screw, a second screw is secured to said second lid and has a head projecting out of said second lid with said second electrical connector connected to said second screw, and wherein, when an electrical outlet is to be tested, then the screwdriver on the first lid is inserted into said electrical outlet, and a user touches the head of the second screw, thereby a closed electrical loop is established comprising, in sequence, the electrical outlet, the screwdriver, the first electrical connector, the light emitting means, the second connector, and the user's body, such that, when the electrical outlet is powered, then the light emitting means generates light observed through said second lid.

* * * * *